W. F. HEROLD.
CASTER WHEEL.
APPLICATION FILED MAY 17, 1921.

1,405,585.

Patented Feb. 7, 1922.

Inventor
Walter F. Herold
By his Attorney
Dyer Smith

UNITED STATES PATENT OFFICE.

WALTER F. HEROLD, OF NEWARK, NEW JERSEY, ASSIGNOR TO THE BASSICK COMPANY, OF BRIDGEPORT, CONNECTICUT, A CORPORATION OF CONNECTICUT.

CASTER WHEEL.

1,405,585.    Specification of Letters Patent.    Patented Feb. 7, 1922.

Application filed May 17, 1921. Serial No. 470,248.

*To all whom it may concern:*

Be it known that I, WALTER F. HEROLD, a citizen of the United States, and resident of Newark, in the county of Essex and State of New Jersey, have invented certain new and useful Improvements in Caster Wheels, of which the following is a specification.

The invention relates to improvements in caster wheels and particularly to wheels for casters which are required to carry comparatively heavy pieces of furniture or other articles. One of the objects of the invention is the provision of a caster wheel which shall be strong and rigid and well adapted to carry heavy weights while being at the same time comparatively light in construction and inexpensive in manufacture. Another object is the provision of a caster wheel, the web of which shall give the appearance of a comparatively heavy construction while actually being comparatively light, the web being so formed and braced as to be well adapted to withstand the stresses to which it is subjected in use. Another object is the provision of a caster wheel which may effectively be cast as an integral construction from iron or other metal. Other objects of the invention consist in the combinations of parts and constructional details as will appear more fully hereinafter in the following specification, and be particularly pointed out in the appended claims.

The invention comprises a wheel in which the web portion takes the form of a disk which has radial corrugations therein extending from points adjacent to the periphery of the disk towards the hub. These corrugations are particularly designed to strengthen the construction at the joint between the web and the hub. The web preferably joins the rim at the vertical central plane of the wheel and the corrugations extend to the hub at inclinations to this central plane. In the preferred construction the corrugations have surfaces which are convex on one side and concave on the opposite side of the web, in a tangential direction, raised portions and recessed portions alternating around the wheel on each side of the web. With such a construction the maximum of strength and stiffness is provided at the points where same is most required, while at the same time the web may be formed to give the appearance of a heavy, strong construction while actually requiring a comparatively small amount of metal only.

In order that the invention may be more clearly understood, attention is hereby directed to the accompanying drawings forming part of this application, and illustrating one embodiment of the invention. In the drawings, Fig. 1 represents a side elevation of a caster wheel, embodying the invention;

Figure 1:
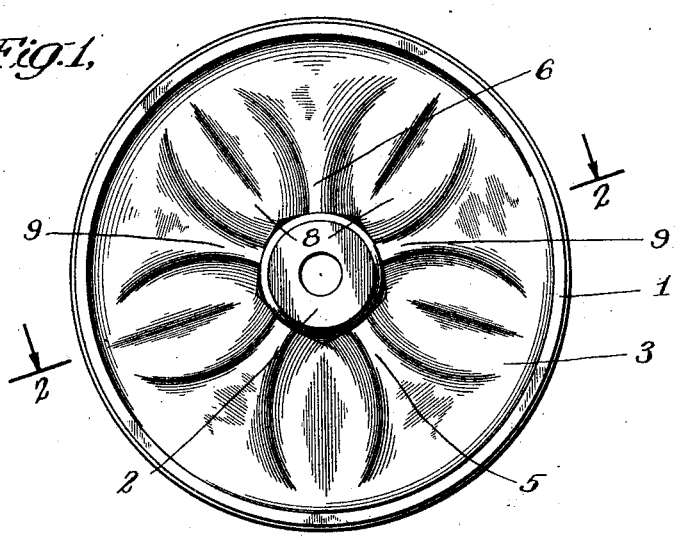
Figure 2:
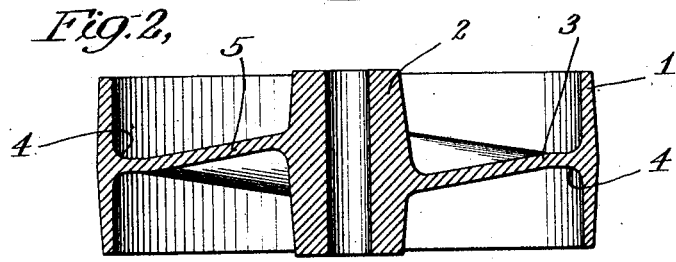
Fig. 2 is a section taken on line 2—2 of Fig. 1.

Referring to the drawings, the wheel comprises a rim portion 1, a hub portion 2 and a web 3 connecting the rim and hub. Preferably the wheel is cast as an integral structure, as stated.

The web 3 preferably joins the rim at the central vertical plane of the wheel. Preferably the web joins the rim with a smooth outwardly directed curve on each side of the web, as is indicated at 4.

Figure 3:
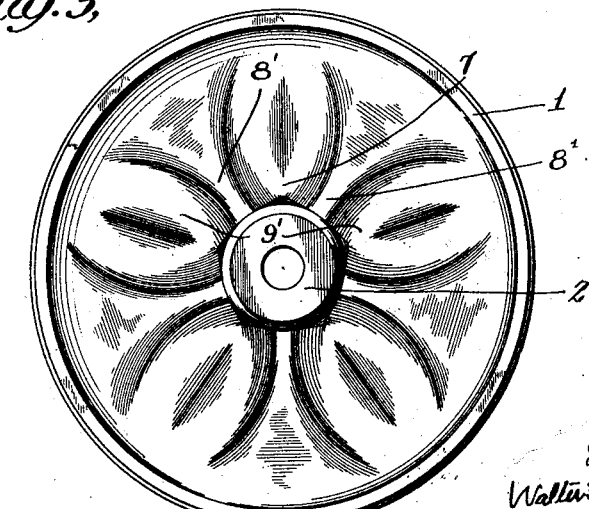
Fig. 3 is a side elevation of the wheel as viewed from the side opposite to that shown in Fig. 1.

The corrugations of the web start from the surface of disk 3 at points which are spaced inwardly from the junction of the web with the rim, slight distances. Each corrugation 5 extends to the hub at an inclination to the vertical central plane of the wheel, the corrugations being formed by arching the metal of the web so that the surface of the same on one side, for example at the point 6 in Fig. 1, will be convexly curved in the tangential direction, or the circumferential direction. On the opposite side of the web the corresponding surface will be concavely curved in the tangential or circumferential direction, as is indicated at 7 in Fig. 3. Ridges or raised portions on each side of the web will alternate with depressed portions, in the tangential or circumferential direction. Thus radial recessed portions 8, 8, are positioned on opposite sides of the ridge or corrugation 6, each of the recessed portions 8 being followed, in the circumferential direction, by ridges or raised portions 9. On the opposite side of the web, ridges or raised portions $8^1$ correspond to the recessed portions 8, and recessed portions $9^1$ correspond to the raised portions 9.

Each corrugation preferably slants at a uniform inclination in the radial direction, as shown. Since, however, the deepest point of any recessed portion, such as 8, is adjacent to the highest portion of any corrugation, such as 6, adjacent to the hub 2, it follows that the curvature of each corrugation, in the tangential or circumferential direction, is steepest at its junction with the hub and becomes progressively less steep towards the rim, the corrugations merging into a plane surface adjacent to the junction of the web with the rim. Because of this construction each corrugation is, in effect, fan shaped, each corrugation being comparatively wide at its outer edge, with a surface which curves gently in the circumferential direction, the width of the corrugation decreasing and its curvature becoming steeper as it approaches the hub.

With this construction the wheel is greatly stiffened at the junction of the web with the hub, at which point it has been found cracks are most likely to develop in the metal, under the stresses to which the wheel is subjected, in the ordinary type of caster wheel. Also, since the web joins the rim substantially in the vertical central plane of the wheel, vertical thrust is transmitted from the rim into the web in a direction parallel to the latter at its junction with the rim so that the construction will be sufficiently stiff at this point.

The construction may readily be formed as an integral casting, for example, in a two part mould, in which case a structure may be cast very readily and effectively, the inclinations of the corrugations aiding in venting the mould.

It should be understood that the invention is not limited to the details of construction which have been particularly described, but is as broad as is indicated by the accompanying claims.

What I claim is:

1. A caster wheel comprising a hub, web and rim, the web being in the form of a disk which joins the rim approximately in a vertical plane, the web being shaped to form radial corrugations which start from said vertical plane and extend to the hub at inclinations to said plane, said corrugations having surfaces which are convex on one side and concave on the opposite side of the web, in the circumferential direction.

2. A caster wheel comprising an integral casting having a hub, web and rim, the web being in the form of a disk which joins the rim approximately at the vertical central plane of the wheel, the web being shaped to form radial corrugations which start from said central plane and extend to the hub at inclinations to said plane, said corrugations having surfaces which are convex on one side and concave on the opposite side of the web, in the circumferential direction.

3. A caster wheel comprising a hub, web and rim, the web being in the form of a disk which joins the rim approximately in a vertical plane, the web being shaped to form radial corrugations which extend to the hub at inclinations to said plane, said corrugations having surfaces which are convex on one side and concave on the opposite side of the web, in the circumferential direction, convexly and concavely curved portions alternating around the web on each side, each corrugation decreasing in width and increasing in steepness of curvature, from the rim towards the hub.

Signed at Newark in the county of Essex and State of New Jersey, this 11th day of May, A. D. 1921.

WALTER F. HEROLD.